Feb. 26, 1929.
O. U. ZERK
1,703,286
LUBRICANT COMPRESSOR
Filed April 19, 1924
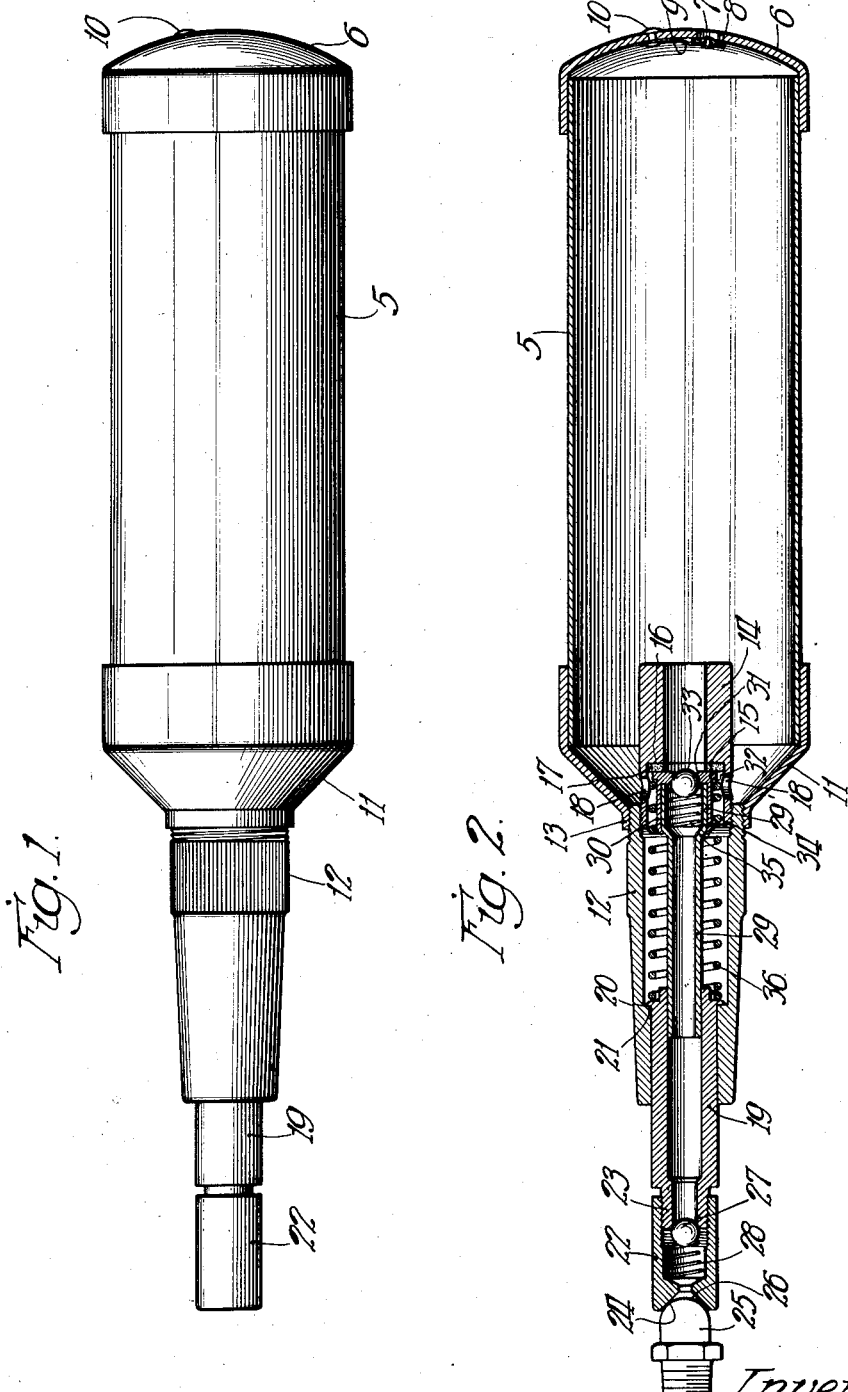
Fig. 1.
Fig. 2.
Inventor
Oscar U. Zerk.
Earl F. Pierce.
Atty.

Patented Feb. 26, 1929.

1,703,286

UNITED STATES PATENT OFFICE.

OSCAR U. ZERK, OF CLEVELAND, OHIO, ASSIGNOR TO ALEMITE MANUFACTURING CORPORATION, OF CHICAGO, ILLINOIS, A CORPORATION OF DELAWARE.

LUBRICANT COMPRESSOR.

Application filed April 19, 1924. Serial No. 707,698.

My invention relates to improvements in lubricant compressors, and is particularly concerned with improvements in that type of lubricant compressor which forms a part of a system embodying a plurality of fittings adapted to be secured to the bearings to be lubricated, and a compressor for supplying lubricant under pressure to the fittings.

My present invention relates to that type of compressor in which the pressure upon the lubricant is generated, or created, by a force exerted upon the compressor in a direction toward the fitting to which the compressor is supplying lubricant.

The object of my present invention is to provide a compressor, such as described, which is simple in construction, economical to manufacture and by means of which the operator can easily exert comparatively high pressures upon the lubricant being forced into the fittings.

Other objects of my invention will appear as this description progresses, reference being had to the accompanying drawings in which Figure 1 is a side elevation of my improved compressor, and Figure 2 is a central longituidnal section.

Referring to the drawings my improved compressor comprises a barrel 5 having a closure 6 permanently secured to one end thereof, and provided with a relief port 7 which is closed by a valve 8, preferably of leather. This valve is held in place by means of leaf spring 9 secured to the cap by a rivet 10, or any other desired means.

The opposite end of the barrel terminates in a conical shaped cap 11 to which is secured the guide tube 12, this tube and the cap 11 being united by a screw threaded connection 13.

A sleeve 14 is threaded into the inner end of the guide tube 12. This sleeve has an enlarged bore 15 at its outer end, forming an annular seat 16, which is preferably covered by means of a gasket 17 of leather, fiber, or any other suitable material. Ports 18 formed in the wall of the sleeve 14, outwardly beyond the seat 16, provide means for establishing communication between the barrel 5 and the interior of the guide tube 12. The barrel 5, guide tube 12 and sleeve 14 together constitute a rigid body guiding and supporting the movable parts hereinafter described.

A cylinder 19 is reciprocably mounted in the outer end of the guide tube 12 and is prevented from being displaced therefrom by flanging the inner end of the cylinder, as shown at 20, for engagement with a shoulder 21 formed in the guide tube 12. A cap 22 is threaded onto the outer reduced portion 23 of the cylinder 19, and has a conical depression 24 formed in its outer end, for establishing sealed contact with a fitting such as shown at 25, this fitting being provided with a spherical surface 26 for contacting with the conical surface of the depression 24.

A closure 27 is yieldingly held against the outer end of the cylinder 19 by means of the compression spring 28 which is confined between the outer end of the cap 22 and the closure 27.

A hollow, or tubular, plunger 29 is mounted in the guide tube 12 and reciprocable in the cylinder 19. The inner end 29' of the plunger 29 is enlarged in diameter as shown in the drawing and is closed by a cap 30 having a central port 31 and an outwardly extending flange 32. A closure 33 is yieldingly held in contact with the inner side of the end of the cap 30 by means of the compression spring 34, which is confined between the closure 33, and the shoulder 35, formed in the hollow plunger 29.

A compression spring 36 confined between the inner end of the cylinder 29 and the annular plunger 32 provides means for yieldingly holding the cylinder 19 in its outermost position, and the plunger in its innermost position, with the end of the cap 30 in contact with the gasket 17. In other words the spring 36 yieldingly holds the cylinder 19 and the plunger 29 in separated relation to each other.

It should be noted that the plunger 29 is not rigidly connected with any other portion of the compressor but is free to move with respect to all other portions of the compressor. In other words the plunger 29 merely floats in the cylinder 12.

In using my improved compressor the operator first unscrews the guide tube 12 from the closure 11 and removes the guide tube, and the parts supported thereby, from the compressor, and then substantially fills the barrel through the opening in the closure 11. The guide tube 12, with its associated parts, is then secured to the compressor, and the cap or nozzle 22 brought in contact with the end of a fitting 25, in the manner shown in Figure 2. The operator thereupon pushes against the cap 6 of the compressor in the direction of the fitting 25. This causes the plunger 29 to enter the cylinder 19, thereby displacing a portion of the contents of the cylinder 19 past the valve 27, and out through the cap or nozzle 22 and into the fitting. The operator then releases the pressure upon the cap 6 whereupon the spring 36, expanding, causes the parts to reassume the position shown in Figure 2. When the plunger 29 begins to move out of the cylinder 19 the valve 27 closes, under the tension of the spring 28, and thereby prevents the access of air to the interior of the cylinder. As the plunger 29 continues to be drawn from the cylinder 19 a vacuum is formed in the cylinder and when this reaches sufficient intensity atmospheric pressure exerted upon the lubricant in the barrel 5 will cause the lubricant to be forced past the valve 33, against the tension of the spring 34, which is a very light spring, and into the plunger 29 and cylinder 19. The operator thereupon again forces the barrel 5 toward the fitting 25, and thus repeats the process just described until sufficient lubricant has been forced into the fitting.

My object in enlarging the inner end 29' of the plunger 29 is to make it possible to confine, in the plunger, a closure 33 having as large as possible an area exposed to the pressure of the lubricant in the barrel 5, so that there will always be sufficient pressure exerted upon the outer surface of the closure 33 to open it against the tension of the spring 34.

When the barrel 5 is moved toward a fitting 25, the inner end of the cylinder 19 is moved into the sleeve 12 and displaces a part of the contents of this cylinder. The lubricant thus displaced is forced through the ports 18 into the barrel 5. A certain amount of leakage of air from the exterior to the interior of the guide tube 12 will take place between the guide tube 12 and the cylinder 19 and I have provided a sleeve 14 to prevent this air, when it is displaced from the guide tube 12, from being immediately drawn back into the plunger 29 and the cylinder 19. This is accomplished by the construction shown inasmuch as this air is discharged at a point remote from the entrance to the sleeve 14, and there is little likelihood that it will be drawn into this sleeve, and from thence, into the cylinder 19 and plunger 29.

While I have described the details of construction of the preferred embodiment of my invention it is to be clearly understood that my invention is not to be limited to these details but is capable of other adaptations and modifications within the scope of the appended claims.

Having thus described my invention what I claim is:

1. A lubricant compressor comprising a barrel closed at one end and terminating at its other end in a removable guide tube, a cylinder slidably mounted in the outer end of said tube, the outer end of said cylinder being provided with means for making sealed contact with a lubricant fitting, a check valve closing the outer end of said cylinder, a sleeve threaded into the inner end of said guide tube and provided with a port for establishing communication between said barrel and said guide tube, and comprising an outwardly facing annular seat, a hollow plunger reciprocable in said cylinder, the inner end of said plunger being enlarged and provided with a valve seat, a valve coacting with said seat, a spring yieldingly holding said valve in closed position and another spring for yieldingly holding said cylinder and said plunger in separated relation, and for holding the inner end of said plunger against said annular seat.

2. A lubricant compressor comprising a barrel closed at one end and terminating at its other end in a guide tube, a cylinder slidably mounted in the outer end of said tube, the outer end of said cylinder being provided with means for making sealed contact with a lubricant fitting, a check valve closing the outer end of said cylinder, a sleeve secured to the inner end of said guide tube and comprising an outwardly facing annular seat, a hollow plunger reciprocable in said cylinder, the inner end of said plunger being enlarged and provided with a valve seat, a valve coacting with said seat, a spring yieldingly holding said valve in closed position, and another spring for yieldingly holding said cylinder and said plunger in separated relation, and for holding the inner end of said plunger against said annular seat.

3. A lubricant compressor comprising a barrel terminating in a guide tube, a cylinder slidably mounted in the outer end of said tube, the outer end of said cylinder being provided with means for making sealed contact with a lubricant fitting, a sleeve secured to the inner end of said guide tube and comprising an outwardly facing annular seat, a hollow plunger reciprocable in said cylinder, the inner end of said plunger being provided with a valve seat, a valve coacting with said seat, a spring yieldingly holding said valve in closed position, and another spring for yieldingly holding said cylinder and said plunger in separated relation, and for holding the inner end of said plunger against said annular seat.

4. A lubricant compressor comprising a barrel terminating in a guide tube, a cylinder slidably mounted in the outer end of said tube, a sleeve secured to the inner end of said guide tube, a hollow plunger reciprocable in said cylinder, the inner end of said plunger being provided with a valve seat, a valve coacting with said seat, a spring yieldingly holding said valve in closed position, and another spring for yieldingly holding said cylinder and said plunger in separated relation.

5. A lubricant compressor comprising a barrel terminating in a guide tube, a cylinder slidably mounted in the outer end of said guide tube and movable in and out of said tube, a hollow plunger floating in the inner end of said tube and telescoping with said cylinder, a stop carried by said tube for limiting inward movement of said plunger, a valve for closing the inner end of said plunger, and a spring for yieldingly holding said cylinder and plunger in separated relation.

6. A lubricant compressor comprising a barrel terminating in a guide tube, a cylinder slidably mounted in the outer end of said guide tube and movable in and out of said tube, a hollow plunger floating in the inner end of said tube and telescoping with said cylinder, a valve for closing the inner end of said plunger, a stop for said plunger, and a spring for yieldingly holding said cylinder and plunger in separated relation and urging said plunger against said stop.

7. A lubricant compressor comprising a barrel, a guide tube secured to said barrel, a hollow plunger carried by said guide tube and communicating with said barrel, a check valve through which lubricant enters said plunger, a cylinder carried by said guide tube and reciprocable over said plunger, and a spring for holding said cylinder in its outermost position.

8. A lubricant compressor comprising a barrel, a cylinder communicating with said barrel and reciprocably mounted thereon, a plunger coacting with said cylinder for discharging lubricant from said cylinder, said compressor comprising other means for discharging air, entering said compressor along said cylinder, at a point remote from the point of communication between said cylinder and said barrel.

9. A lubricant compressor comprising a body, ejecting means at one end of said body having an axial inlet, said end and ejecting means having an annular sliding joint for supporting the latter and forming a chamber receiving the leakage from saaid joint, and means for ejecting the contents of said chamber laterally remote from said inlet.

10. A lubricant compressor comprising a barrel having an end wall, said wall having an opening therethrough, a compression cylinder reciprocably mounted in said opening, an inlet passage for said cylinder, said inlet passage communicating with said barrel at a point adjacent said end wall, an outlet passage for said cylinder, means closing said outlet passage to the entry of air therethrough, and means for preventing the air leaking along said cylinder from entering said inlet passage.

In testimony whereof I have hereunto signed by name this 1st day of April, 1924.

OSCAR U. ZERK.